Patented July 7, 1942

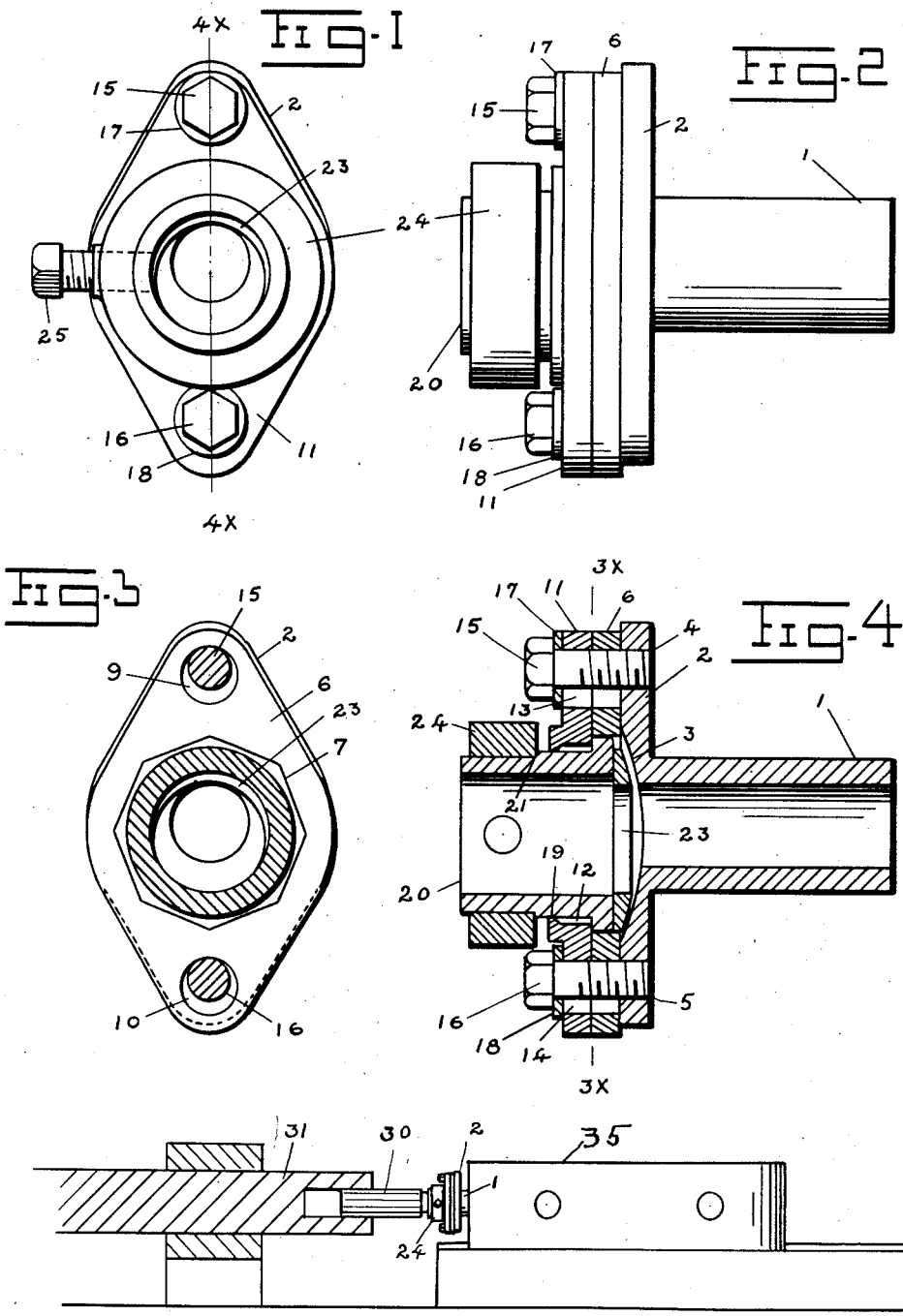

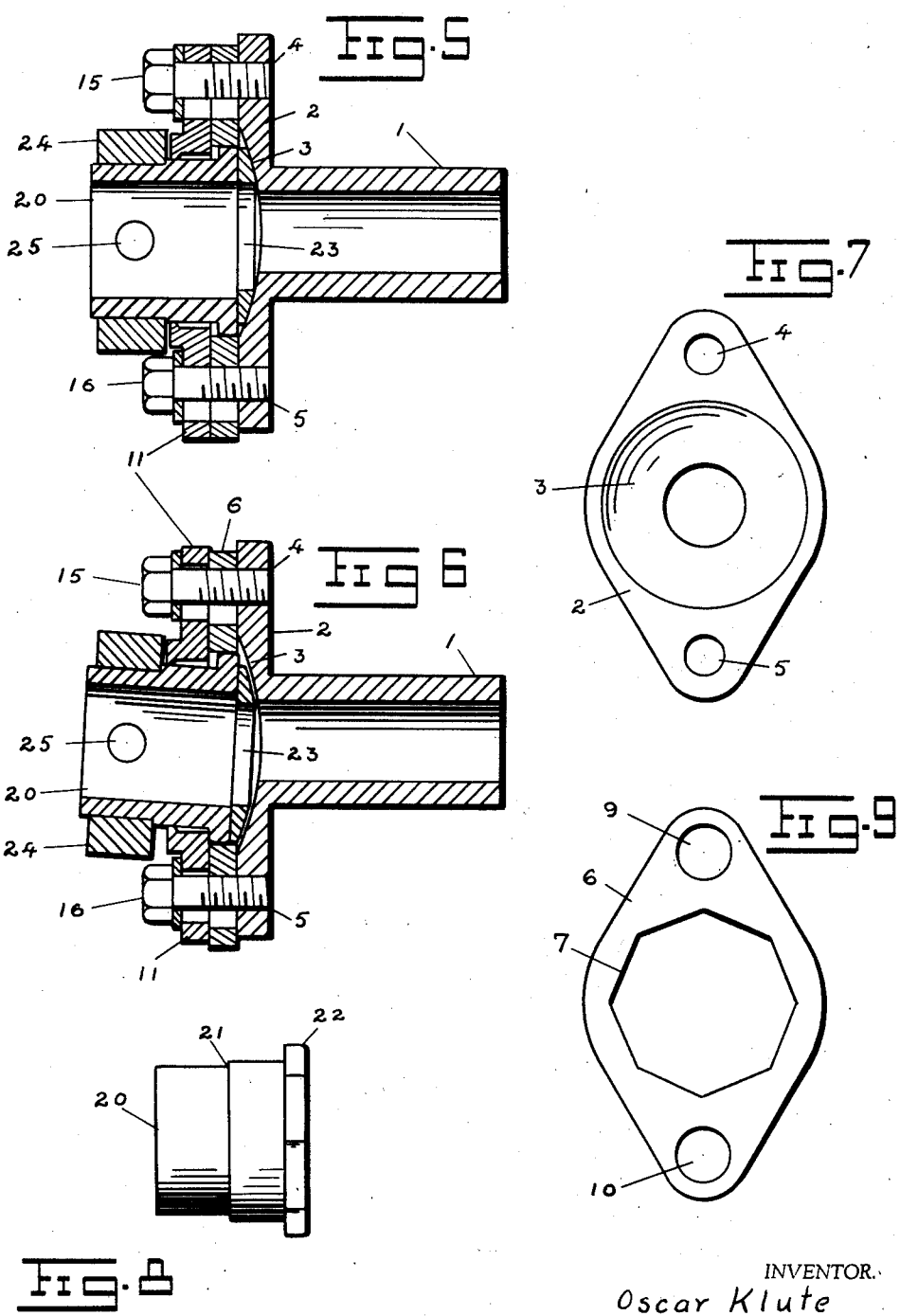

2,288,907

UNITED STATES PATENT OFFICE 2,288,907

TOOL HOLDER FOR REAMERS

Oscar Klute, Rochester, N. Y.

Application March 14, 1941, Serial No. 383,385

10 Claims. (Cl. 279—16)

It is the regular practice in making so-called screw machine parts to use so-called screw machines or turret lathes. Many kinds of screw machine parts have a hole bored in one end thereof, and this hole must then be reamed out or finished to the correct size or diameter. The finished hole must be kept concentric with the outside of the screw machine part and must have the same diameter throughout. In finishing such holes it is the usual practice to use a reamer. When a screw machine or turret lathe is new the reamer mounted thereon will ordinarily be accurately centered with the hole in the stock to be reamed. It will also be understood that the stock is carried on the spindle and rotates with the spindle, and the drill and boring tool on the turret remains stationary while they are being used in the boring operation.

It will also be understood that as the parts of the machine wear, the turret will drop down and the reamer carried thereon will be out of line with the center line of the spindle by a few thousandths of an inch. If the spindle is belt driven from an overhead pulley it has a tendency to raise the spindle and the stock, so that the reamer on the turret lathe will be out of line with the center of the stock that is carried on the spindle. This difference sometimes amounts to .020".

It is also understood that while the boring tool in the turret lathe will cut the hole accurately in the stock, the reamer will not finish the hole accurately unless it is accurately centered with the hole to start with.

Unless this is corrected, the hole will be finished by the reamer with a taper, which must be avoided. To correct such errors in the centering of the reamer, if they exist, namely, in order to bring the reamer on the turret accurately into line with the hole in the stock on the spindle, I have made an invention, the objects of which are described as follows:

One object of this invention is to provide a tool holder held by the turret, which holder contains certain parts that support the reamer. These parts will be adjustable and can be released and unclamped from each other at the start while the reamer is being centered in the hole previously bored in the stock. With the reamer thus centered, the moving parts will thereby be placed in proper adjustment and can then be clamped together for the purpose of holding the reamer in correct position during the reaming operation.

Another object of this invention is to provide a tool holder which will hold the reamer in correct position during the reaming operation and still permit it to float to a very small extent to adjust itself.

Another object of the invention is to provide a tool holder that will hold the reamer firmly and yet permit the reamer to follow the hole that has previously been bored in the stock that is to be finished by the reamer.

Another object of the invention is to provide a tool holder with a flanged head thereon and two plates clamped thereon, said plates being adjustable in any direction on the flanged head.

Another object of the invention is to provide a tool holder having a flanged head thereon with a spherical seat therein, and means on the flanged head for holding a sleeve thereon, said sleeve being movable forward and back toward and away from the sperical seat and having a slight rocking motion on the spherical seat.

Another object of the invention is to provide a tool holder and a sleeve for holding the tool mounted in the tool holder, said sleeve having an octagonal flange on the rear end thereof engaging in an octagonal opening in the tool holder.

These and other objects of the invention will be illustrated in the drawings, described in the specification, and pointed out in the claims at the end thereof.

In the drawings:

Figure 1 is a front elevation of the reaming tool holder.

Figure 2 is a side elevation of the reaming tool holder shown in Figure 1.

Figure 3 is a vertical transverse section on the line $3x$—$3x$ of Figure 4.

Figure 4 is a vertical longitudinal section on the line $4x$—$4x$ of Figure 1.

In Figures 1 to 4, inclusive, the floating sleeve is shown in its advanced position, forward of the seat.

Figure 5 is a vertical longitudinal section through the reaming tool holder similar to that shown in Figure 4, with the floating sleeve pressed against its seat. In all of the Figures 1 to 5, inclusive, the axis of the floating sleeve is shown out of line with the axis of the shank of the tool holder, but is shown parallel thereto.

Figure 6 is a vertical longitudinal section through the reaming tool holder, in which the floating sleeve is pressed back against the seat, and the axis of the floating sleeve is placed at an angle to the axis of the shank of the tool holder.

Figure 7 is an end view of the shank showing the spherical seat on the forward end thereof.

Figure 8 is a detail view of the floating sleeve.

Figure 9 is a detail view of a plate placed intermediate of the tool, which plate has an octagonal hole cut centrally therein.

Figure 10 is a diagrammatic view of the turret lathe equipped with a tool holder and a reamer, the reamer being shown engaged with the stock.

In the drawings like reference numerals indicate like parts.

In the drawings reference numeral 1 indicates the shank of the tool holder, having a flanged oval-shaped head 2 integral therewith. In this head is formed a concave or spherical seat 3. In this head is also formed holes 4 and 5 having female threaded openings therein.

Placed forward of the flanged oval-shaped head 2 is the intermediate plate 6, having substantially the same outline as the flanged head on the shank. In this intermediate plate is a hole 7 having eight sides therein, hereinafter referred to as an octagon-shaped hole. At the top and bottom of this plate are smooth bore openings 9 and 10 similar to the openings 4 and 5 in the head 2. These openings, however, are of larger diameter than are the openings 4 and 5, and are not threaded.

In front of the intermediate plate 6 is the forward plate 11 having a round hole 12 centrally thereof, and having a hole 13 and 14 at each end thereof, which holes are of approximately the same diameter as the corresponding holes in the intermediate plate 6. These plates 6 and 11 are clamped on the flanged head 2 by the studs 15 and 16. Each of these studs has a washer 17 and 18 thereon under the head of the stud. The holes at the top and bottom of the plates 6 and 11 are considerably larger in diameter than the diameter of the studs 15 and 16, so that these plates can float on or be adjusted on the studs, and when placed in their correct position they are firmly clamped in place by tightening up the studs.

The large round hole 12 in the forward plate 11 is counterbored from the rear to form an inwardly projecting flange 19 at the front thereof. At the front of this tool holder is placed a long sleeve 20 formed with a shoulder 21 at an intermediate point thereof and an octagon shaped flange 22 on the rear end thereof. The edges of the eight sides of this flange are each rounded off, being made somewhat convex, and the eight sides of the hole 7 in the intermediate plate 6 are made flat. The plate 6 is somewhat thicker than the flange 22 and this gives room for the flange to swing in as it is adjusted in the first place and later as it is permitted to float in the end thrust toward and away from the spherical seat 3 after the studs 15 and 16 are tightened up. This permits the flanged head 22 to rock slightly in the hole 7 of the plate 6. Back of the flanged head 22 is placed a floating washer 23, which washer is flat on its forward side and is spherical on the rear side.

It will also be understood that the eight-sided flange engages somewhat loosely in the eight-sided hole, so that the reamer can adjust itself to its work and will be held against turning as it reams the hole.

On the forward end of the sleeve 20 is placed a collar 24, which is held in place thereon by a set screw 25.

The parts are assembled by first inserting the sleeve 20 in the forward plate 11, and then placing the plate 6 on the flanged head of the sleeve and placing the washer 23 against the rear end of the sleeve 20. The shank 1 with its flanged head is then placed in proper position, and the three parts namely, 11, 6 and 2 are joined together by the studs 15 and 16 and washers 17 and 18. The collar 24 is then placed on the sleeve 20 and clamped in place thereon.

In reaming holes from .040" up to 4" in diameter a series of six or eight of these tools graduated in size would be sufficient.

In operation the studs 15 and 16 are loosened up and the reamer is inserted in the sleeve 20 and if necessary a collar can be interposed between the reamer and the sleeve so as to make it a close fit therein. The tool holder is then placed in the turret head. Then the turret head is moved forward, pushing the reaming tool into the hole that is to be finished. The plates 6 and 11 then adjust themselves as the reaming tool centers itself in the hole. Then the studs 15 and 16 are tightened up, and the screw machine with this set-up is then ready to perform the reaming operation.

It will also be understood that because of errors in the screw machine, the parts of the tool holder will automatically take the various positions shown in the drawings. As long as the axis of the sleeve 20 is parallel to or coincident with the axis of the shank 1, the holes in the plates 6 and 11 will line up with each other, as shown in Figures 4 and 5, but if the axis of the sleeve and the shank are at an angle to each other, as shown in Figure 6, the plates will shift one on the other and then they can be clamped together in such shifted position with the certainty that the reaming tool will function correctly in finishing the hole.

When the parts are assembled as shown and described, the sleeve 20 can move back and forth toward and away from the spherical seat 3 and can adjust itself by several thousandths of an inch so that while it holds the reamer firmly it permits the reamer to follow the hole in the stock accurately, and thus finish the hole accurately.

It will also be understood that while I have shown the flange 22 and the opening 7 with eight sides, because that number gives, as I believe, the best results, the flange and hole could be provided with any larger or smaller number of sides.

In Figure 10 I have shown a diagrammatic view of the assembly or machine in operation, in which 35 represents the turret of the turret lathe, 2 indicates the oval shaped head of the chuck, 30 indicates the reamer which is held against rotation, and 31 indicates the stock which is revolved as the reamer is pushed forward.

I claim:

1. In a tool holder for a reamer, the combination of a shank having a large flanged head on the forward end thereof, said flanged head having a concave seat centrally located on the forward end thereof and a flat surface thereon surrounding the concave seat, a sleeve having a small flange on the rear end thereof, a washer interposed between the rear end of said sleeve and said concave seat, means surrounding the small flange and separate therefrom and bolted to the flat surface of the large flanged head for holding the two flanges together so that the one cannot turn on the other, said holding means permitting the axis of the sleeve to float angularly with reference to the axis of the shank.

2. In a tool holder for a reamer, the combination of a shank having a large flanged head on the forward end thereof, said flanged head having a concave seat centrally located on the forward end thereof and a flat surface thereon surrounding the concave seat, a sleeve having a small flange on the rear end thereof, a washer interposed between the rear end of said sleeve and said concave seat, means surrounding the small flange and separate therefrom and bolted to the flat surface of the large flanged head for holding the two flanges together so that the one cannot turn on the other, said means permitting the axis of the sleeve to float freely into or out of line with the axis of the shank, or at an angle thereto, said means being adjustable to thereafter limit the floating of the sleeve on the shank.

3. In a tool holder for a reamer, the combination of a shank having a flanged head on the forward end thereof, a spherical seat in the forward end of said head, a forward plate and an intermediate plate, said intermediate plate having an octagonal opening centrally therein, screws engaging with said flanged head and passing through said plates for clamping said plates adjustably thereon, said plates having holes therein considerably larger than the screws that pass through them, a sleeve having an octagonal shaped flange on the rear end thereof, said flange engaging in the octagonal opening in the intermediate plate by which it is held against rotation, said sleeve floating in the openings in the intermediate and the end plate, a plano-convex shaped floating washer interposed between the spherical seat and the end of the sleeve.

4. A holder for a reamer, the combination of a shank having a large flanged head on the forward end thereof, said flanged head having a concave seat centrally located on the forward end thereof and a flat surface thereon surrounding the concave seat, a sleeve having a small flange on the rear end thereof, a washer interposed between the rear end of said sleeve and said concave seat, means surrounding the small flange and separate therefrom and bolted to the flat surface of the large flanged head for holding the two flanges together so that the one cannot turn on the other, said holding means permitting the axis of the sleeve to move laterally in any direction with reference to the axis of the shank.

5. A holder for a reamer, the combination of a shank having a large flanged head on the forward end thereof, said flanged head having a concave seat centrally located on the forward end thereof and a flat surface thereon surrounding the concave seat, a sleeve having a small flange on the rear end thereof, a washer interposed between the rear end of said sleeve and said concave seat, means surrounding the small flange and separate therefrom and bolted to the flat surface of the large flanged head for holding the two flanges together so that the one cannot turn on the other, said holding means permitting the axis of the sleeve to move laterally in any direction with reference to the axis of the shank and to tilt in any direction with reference to the axis of the shank.

6. A holder for a reamer, the combination of a shank having a large flanged head on the forward end thereof, said flanged head having a concave seat centrally located on the forward end thereof and a flat surface thereon surrounding the concave seat, a sleeve having a small flange on the rear end thereof, a washer interposed between the rear end of said sleeve and said concave seat, means surrounding the small flange and separate therefrom and bolted to the flat surface of the large flanged head for holding the two flanges together so that the one cannot turn on the other, said holding means permitting the axis of the sleeve to move laterally in any direction with reference to the axis of the shank and to tilt and move laterally in any direction with reference to the axis of the shank.

7. In a tool holder for a reamer, the combination of a shank having a flanged head on the forward end thereof, said flanged head having a concave seat centrally located on the forward end thereof and a flat surface thereon surrounding the concave seat, said head having threaded openings therein diametrically opposite each other, a forward plate and an intermediate plate, screws engaging with said flanged head for clamping said plates adjustably thereon, said plates having holes therein considerably larger than the screws that pass through them permitting said plates to be adjusted transversely of the flanged head and the binding screws in any direction, said screws being capable of clamping said plates in their adjusted position, a sleeve and washer surrounded by and held in place by said plates and limited in endwise movement by said concave seat.

8. In a tool holder for a reamer, the combination of a shank having a flanged head on the forward end thereof, said head having threaded openings therein diametrically opposite each other, a forward plate and an intermediate plate, screws engaging with said flanged head for clamping said plates adjustably thereon, said plates having holes therein considerably larger than the screws that pass through them permitting said plates to be adjusted transversely of the flanged head and the binding screws in any direction, said screws being capable of clamping said plates in their adjusted position, said plates having central openings therein, a sleeve having a flanged head on the rear end thereof making non-rotative engagement with the intermediate plate and having a tilting engagement forward and back therein in any direction, and having a tilting engagement transversely with the forward plate in any direction.

9. In a holder for a reamer, the combination of a shank having a large flanged head on the forward end thereof, a sleeve having a small flange on the rear end thereof, said last named flange having flat sides, means for holding the two flanges together so that the one cannot turn on the other, said means comprising an intermediate plate and a forward plate, means for clamping said plates on the flanged head of the shank, the intermediate plate having a large central opening therein with flat sides with which the flat sides of the flange on the sleeve loosely engage to prevent rotation, said intermediate plate being thicker than the flange on the sleeve and permitting the flange on the sleeve to tilt in the opening thereof, the forward plate having an opening therein larger in diameter than the sleeve and smaller in diameter than the flange on the sleeve and permitting the sleeve to tilt therein, said forward plate having an inwardly projecting flange on the forward side thereof on which the sleeve can tilt, a washer placed between the flange on the sleeve and the flanged head on the shank, the flange on the sleeve in tilting being confined between the washer and the adjacent rim of the opening of the forward plate, means for fastening the plate in position on the flange of the shank.

10. In a tool holder for a reamer, the combination of a shank having a large flanged head on the forward end thereof, said flanged head having a concave seat centrally located on the forward end thereof and a flat surface surrounding the concave seat, a sleeve having a small flange on the rear end thereof, means surrounding the small flange and separate therefrom and bolted to the flat surface of the large flanged head for holding the two flanges together so that the one cannot turn on the other, said holding means permitting the axis of the sleeve to float angularly with reference to the axis of the shank, means for communicating the end thrust of the shank to the sleeve through the concave seat.

OSCAR KLUTE.